United States Patent
Nishijima et al.

(10) Patent No.: US 8,444,305 B2
(45) Date of Patent: May 21, 2013

(54) MOTORCYCLE HEAD LIGHT DEVICE

(75) Inventors: Hiroshi Nishijima, Saitama (JP); Hiroyasu Ota, Saitama (JP); Hayato Ohashi, Saitama (JP); Eiji Ashihara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/859,813

(22) Filed: Aug. 20, 2010

(65) Prior Publication Data

US 2011/0051443 A1    Mar. 3, 2011

(30) Foreign Application Priority Data

Aug. 31, 2009   (JP) ................. 2009-200505

(51) Int. Cl.
*B62J 6/00* (2006.01)
*F21V 33/00* (2006.01)

(52) U.S. Cl.
USPC ............ 362/475; 362/459; 362/517; 362/518

(58) Field of Classification Search
USPC ................. 362/473–476, 514, 516–522, 459, 362/538–540
See application file for complete search history.

(56) References Cited

U.S. PATENT DOCUMENTS

| | | | | |
|---|---|---|---|---|
| 7,073,928 | B2 * | 7/2006 | Toyofuku | 362/509 |
| 7,273,303 | B2 * | 9/2007 | Mochizuki | 362/475 |
| 2004/0257821 | A1 * | 12/2004 | Toyofuku | 362/475 |
| 2006/0023462 | A1 * | 2/2006 | Uemoto et al. | 362/475 |
| 2006/0056193 | A1 * | 3/2006 | Mochizuki | 362/517 |
| 2006/0193143 | A1 * | 8/2006 | Ohira | 362/473 |
| 2007/0025114 | A1 * | 2/2007 | Isayama | 362/474 |
| 2007/0058381 | A1 * | 3/2007 | Domoto et al. | 362/475 |
| 2007/0236949 | A1 * | 10/2007 | Kurihara | 362/475 |
| 2008/0055918 | A1 * | 3/2008 | Mascadri | 362/475 |
| 2008/0239737 | A1 * | 10/2008 | Aoki | 362/475 |
| 2008/0239738 | A1 * | 10/2008 | Ota et al. | 362/475 |
| 2010/0328963 | A1 * | 12/2010 | Miyagawa | 362/473 |

FOREIGN PATENT DOCUMENTS

JP    11-329014    11/1999

* cited by examiner

*Primary Examiner* — Anne Hines
*Assistant Examiner* — Jose M Diaz
(74) *Attorney, Agent, or Firm* — Squire Sanders (US) LLP

(57) ABSTRACT

A head light device, according to one embodiment, has a head light, a position light provided around the head light, a reflector to reflect bulb light of the head light, and an extension covering the perimeter of the reflector. The extension covers a position in front of the position light, and the extension is provided with openings, and reflection members to guide the light of the position light to the outside.

15 Claims, 6 Drawing Sheets

MOTORCYCLE HEAD LIGHT DEVICE

BACKGROUND

1. Field

Embodiments of the invention relate to a motorcycle head light device.

2. Description of the Related Art

Conventional vehicle head light devices include a device provided with an extension covering a position in front of a position light bulb, in which direct light and reflection light of the position light bulb is guided from a gap between the extension and a reflector to a reflecting surface of the reflector. For an example, see JP-A No. H11-329014.

In vehicle head light device described in JP-A No. H11-329014, the position light bulb cannot be directly seen from the outside, however, as a reflector of a head light bulb which is also used as the reflector of the position light bulb is used for reflection of bulb light. It is difficult to distinguish the outer appearance upon turning-on of the head light from that upon turning-on of the position light. That is, it is difficult to produce a different view of the position light from the head light.

SUMMARY

Embodiments of the present invention have been made in consideration of the above situation. One object is to provide a motorcycle head light device in which the position light bulb cannot be directly seen from the outside, thereby the outer appearance of the motorcycle head light device upon turning-on and turning-off of the position light can be improved, and a distinction between the outer appearance upon turning-on of the head light and that upon turning-on of the position light can be easily made. Further, the outer appearance upon turning-on of the position light can be arbitrarily set, thereby the outer appearance of the motorcycle head light device, especially, the outer appearance upon turning-on of the position light can be improved.

Therefore, embodiments of the present invention are directed to a motorcycle head light device including a head light bulb, a position light bulb provided around the head light bulb, a reflector that reflects bulb light of the head light bulb, and an extension covering the perimeter of the reflector. The extension covers a position in front of the position light bulb, and the extension is provided with openings and reflection members that guide the bulb light of the position light bulb to the outside.

In another embodiment, the position light bulb is provided above the head light bulb, and the extension is provided with a front eave that covers the position in front of the position light bulb. Further, an upper transparent member having the opening and the reflection member that guide the bulb light of the position light bulb to the outside is provided below the front eave.

According to one embodiment, the front eave is formed at a one-step lower level than the surface of the extension.

In another embodiment, side transparent members having the openings and the reflection members that guide the bulb light of the position light bulb to the outside are provided on the sides of the front eave.

According to another embodiment, the side transparent members are concave members having an approximate triangular shape in a front view, and the reflection members of the side transparent members have inwardly curved upper and lower surfaces.

In one embodiment, the side transparent members are provided in a plurality of positions on one side of the extension in a circumferential direction with the head light bulb as a center.

According to another embodiment, the extension has an upper extension covering a position above the reflector and a side extension extending downward from a side of the upper extension.

In another embodiment, the position light bulb and the extension are attached to the head light housing. The head light bulb is attached to the reflector, and the reflector is swingably supported with the head light housing.

Embodiments of the invention may also include a method. The method includes providing a head light bulb, providing a position light bulb around the head light bulb, reflecting, by a reflector, bulb light of the head light bulb, and covering the perimeter of the reflector with an extension. The extension covers a position in front of the position light bulb. The method also includes providing the extension with openings and reflection members for guiding the bulb light of the position light bulb to the outside.

DETAILED DESCRIPTION

Figure 1:
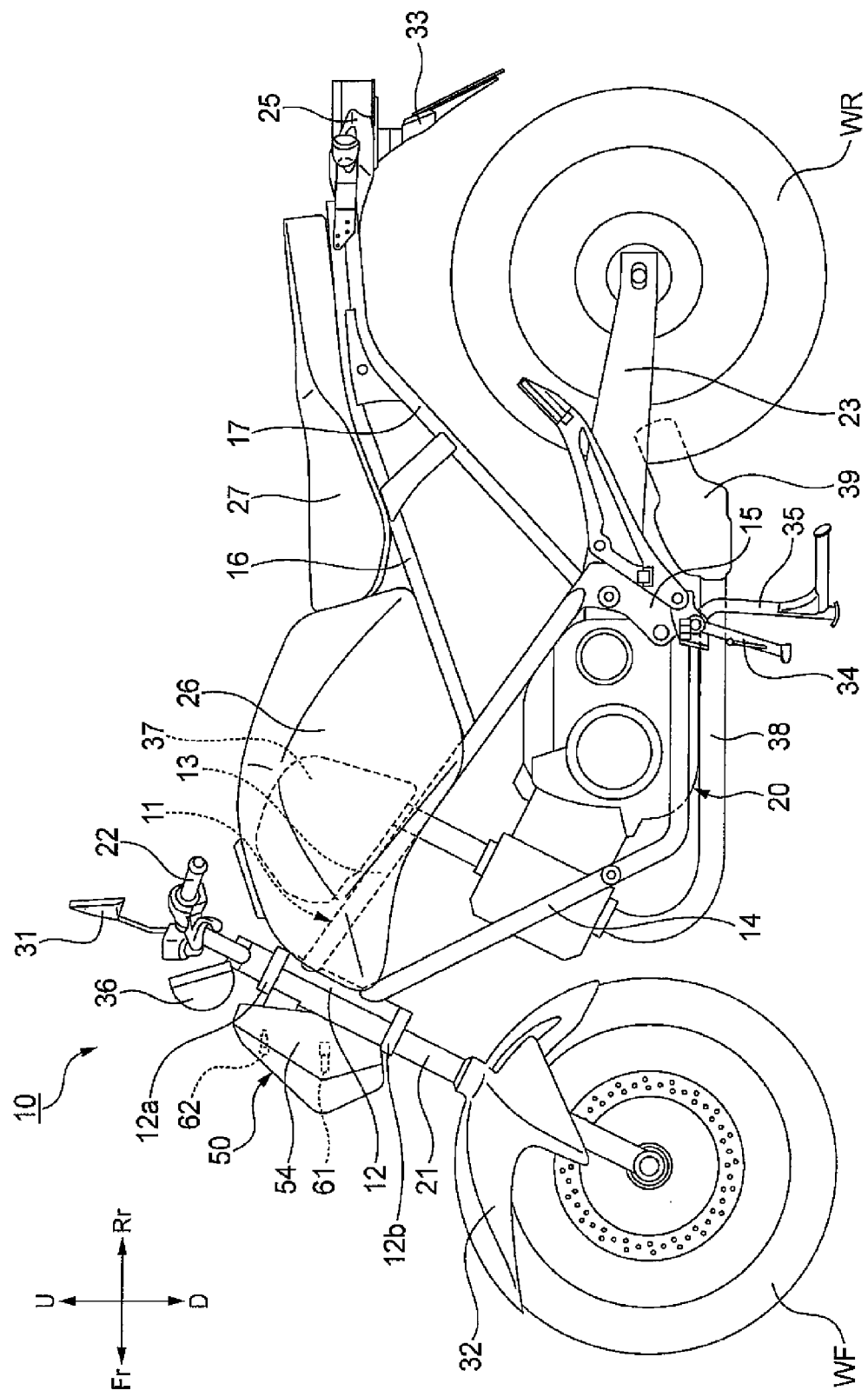
FIG. 1 is a left side view for explaining a motorcycle where an example of a head light device according to an embodiment of the present invention is mounted.

Hereinbelow, an example of a motorcycle head light device according to one embodiment of the present invention will be described in detail with reference to the drawings. Note that the drawings are viewed along the direction of reference numerals, and in the following description, front and rear positions, left and right positions, and upper and lower positions are denoted by, as the front position in the vehicle, Fr; the rear position, Rr; the left side position, L; the right side position, R; the upper position, U; and the lower position, D, in accordance with the direction viewed from a rider.

As shown in FIG. 1, a motorcycle 10 according to one example is a naked type motorcycle without a cowl or fairing around its head light. A vehicle body frame 11 has a head pipe 12 provided at a front end, a pair of left and right main frames 13 extending rearward and downward from the head pipe 12, a pair of left and right down frames 14 extending downward and rearward from the head pipe 12, a pair of left and right pivot plates 15 connected to rear ends of the pair of left and right main frames 13 and the pair of left and right down frames 14, a pair of left and right rear frames 16 connected to an intermediate portion of the pair of left and right main frames 13 and extending rearward, and a pair of left and right reinforcing frames 17 connected to upper ends of the pair of left and right pivot plates 15 and extending rearward. An engine 20 is attached to the main frames 13, the down frames 14 and the pivot plates 15.

Further, according to one embodiment, the motorcycle 10 has a pair of left and right front forks steerably supported with the head pipe 12 via an upper bridge 12a and a lower bridge 12b. The motorcycle 10 can also include a front wheel WF turnably supported with lower ends of the front forks 21, a steering handlebar 22 attached to the upper bridge 12a at upper ends of the front forks 21, a head light device 50 attached to the upper and lower bridges 12a and 12b via a stay (not shown) in front of and above the front forks 21, and swing arms 23 swingably supported with the pivot plates 15. The motorcycle 10 can further include a rear wheel WR turnably supported with rear ends of the swing arms 23, a tail light device 25 attached to rear ends of the rear frames 16, a fuel tank 26 attached above the main frames 13, and a seat 27 attached behind the fuel tank 26 and above the rear frames 16. As illustrated in the example of FIG. 1, motorcycle 10 may also have a side mirror 31, a front fender 32, a rear fender 33, a side stand 34, a main stand 35, a meter 36, an air cleaner 37, an exhaust pipe 38, and a muffler 39.

As shown in the exemplary embodiments of FIGS. 2 to 6, the head light device 50 has a head light housing 51 attached via the stay (not shown) to the upper and lower bridges 12a and 12b on the front fork 21 side. A lens 52 is provided so as to close the entire front opening of the head light housing 51. A reflector 53 is provided between the head light housing 51 and the lens 52 to reflect bulb light of the head light bulb 61. An extension 70 is provided between the head light housing 51 and the lens 52, covering a position above the reflector 53 and left and right sides of the reflector 53, and a pair of left and right side covers covering external side surfaces of the head light housing 51. Note that in FIGS. 2 and 4, the upper part of the lens 52 is cut away, however in one embodiment, the lens 52 covers the entire part, from the top to the bottom of the head light housing 51.

It should be noted that, although the term bulb is used throughout this specification, this term is meant to include any appropriate light or lamp source, such as incandescent bulbs, halogen lamps, xenon lamps, and any other appropriate illumination technology.

Figure 6:
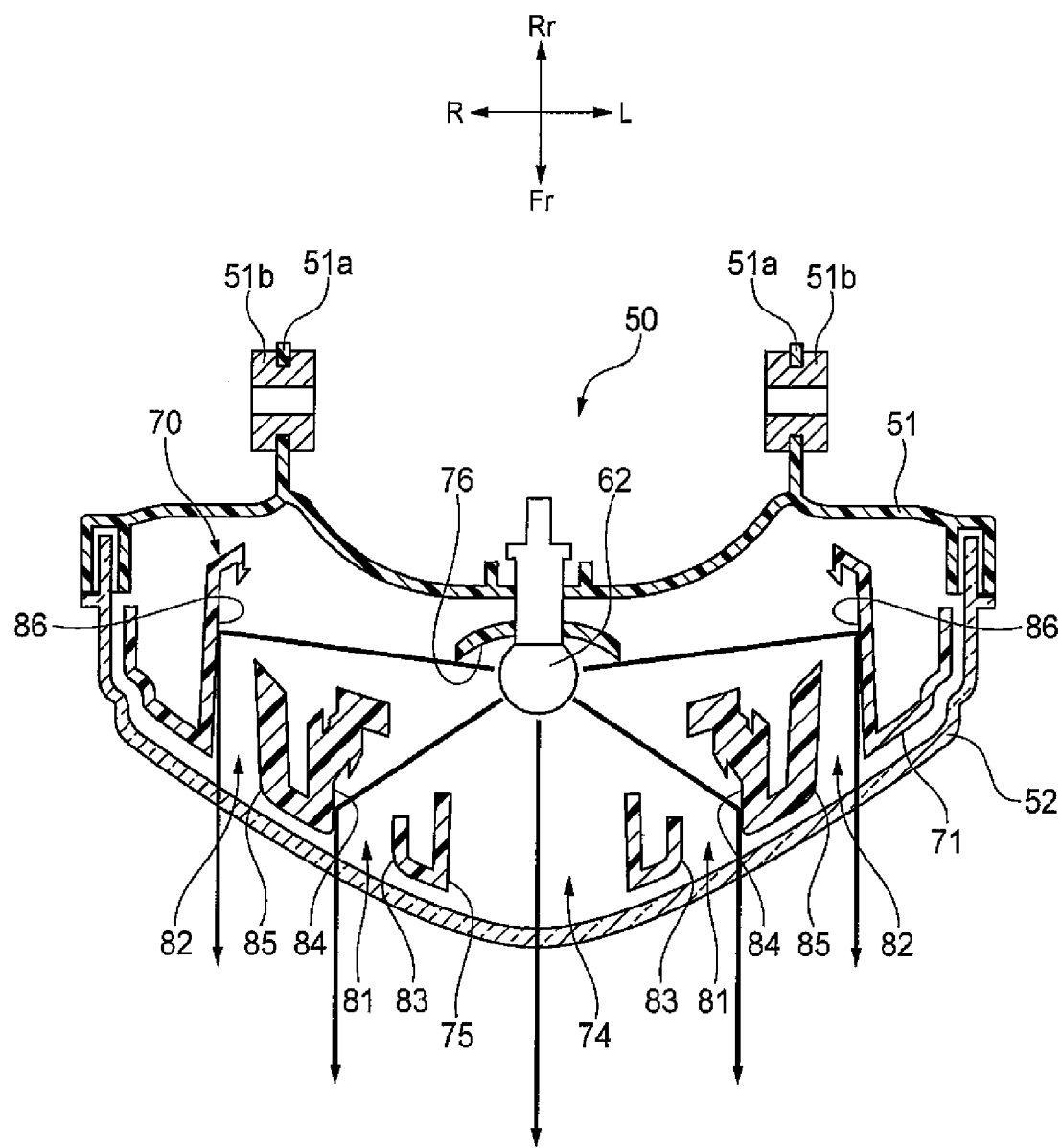
FIG. 6 is a cross-sectional view along an B-B arrow line in FIG. 2.

Further, as shown in FIG. 6, head light attachment members 51a attached to the stay (not shown) of the upper and lower bridges 12a and 12b on the front fork 21 side are respectively formed in left and right positions in a rear surface of the head light housing 51. An elastic member 51b is provided between the head light attachment members 51a and the stay (not shown).

Figure 4:
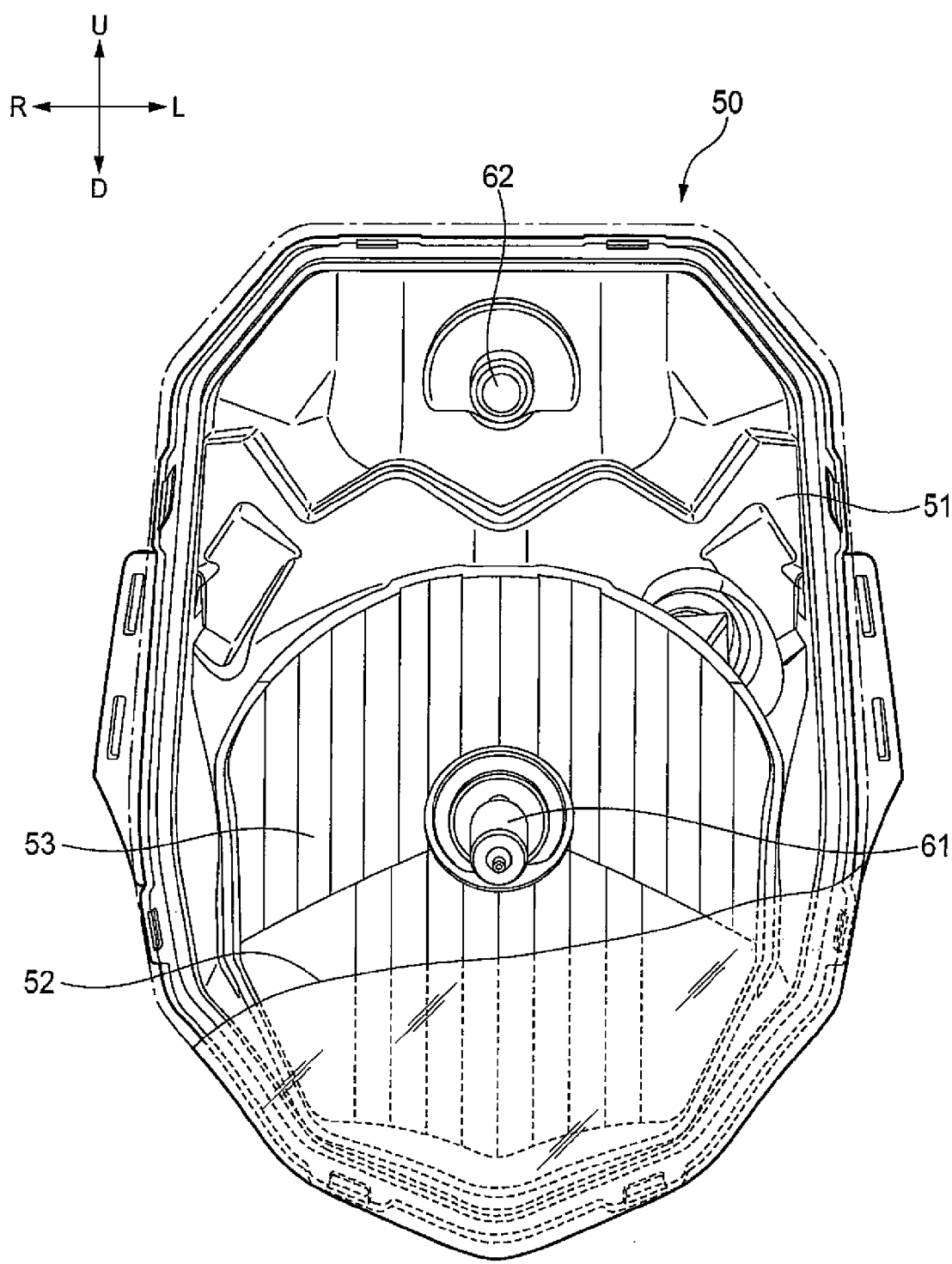
FIG. 4 is a front view of the head light device shown in FIG. 3 where an extension is removed.
Figure 5:
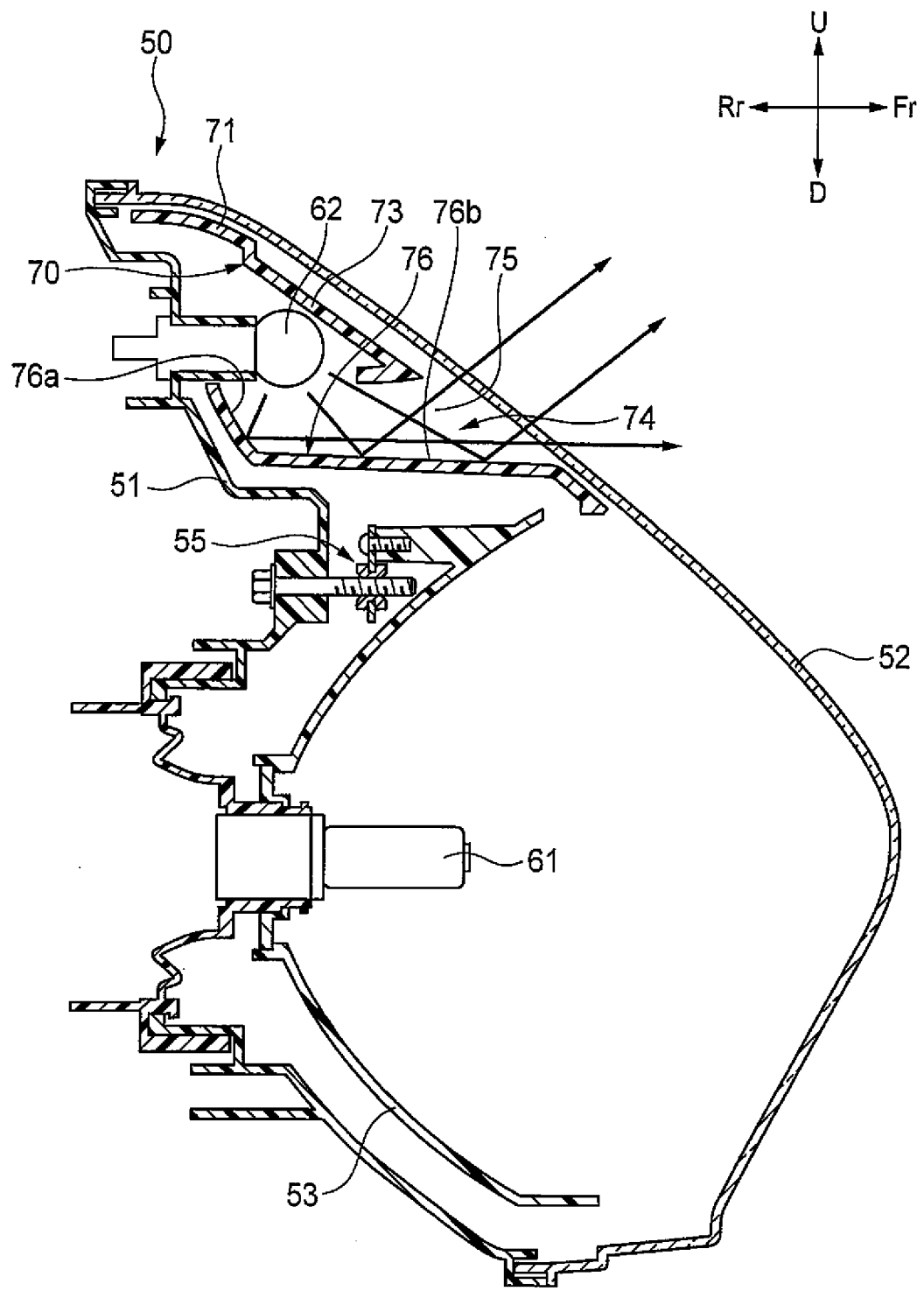
FIG. 5 is a cross-sectional view along an A-A arrow line in FIG. 2.

As shown in FIGS. 4 to 6, according to one embodiment, the reflector 53 has a concave curve facing frontward, as a reflecting surface, and a head light bulb 61 is attached to the approximately central position of the concave curve. Further, the reflector can be swingably supported by an aiming device 55 with the head light housing 51.

Then, in the present example, as shown in FIGS. 4 and 5, a position light bulb 62 is provided above the head light bulb 61. The position light bulb 62 is attached to the head light housing 51.

Figure 2:
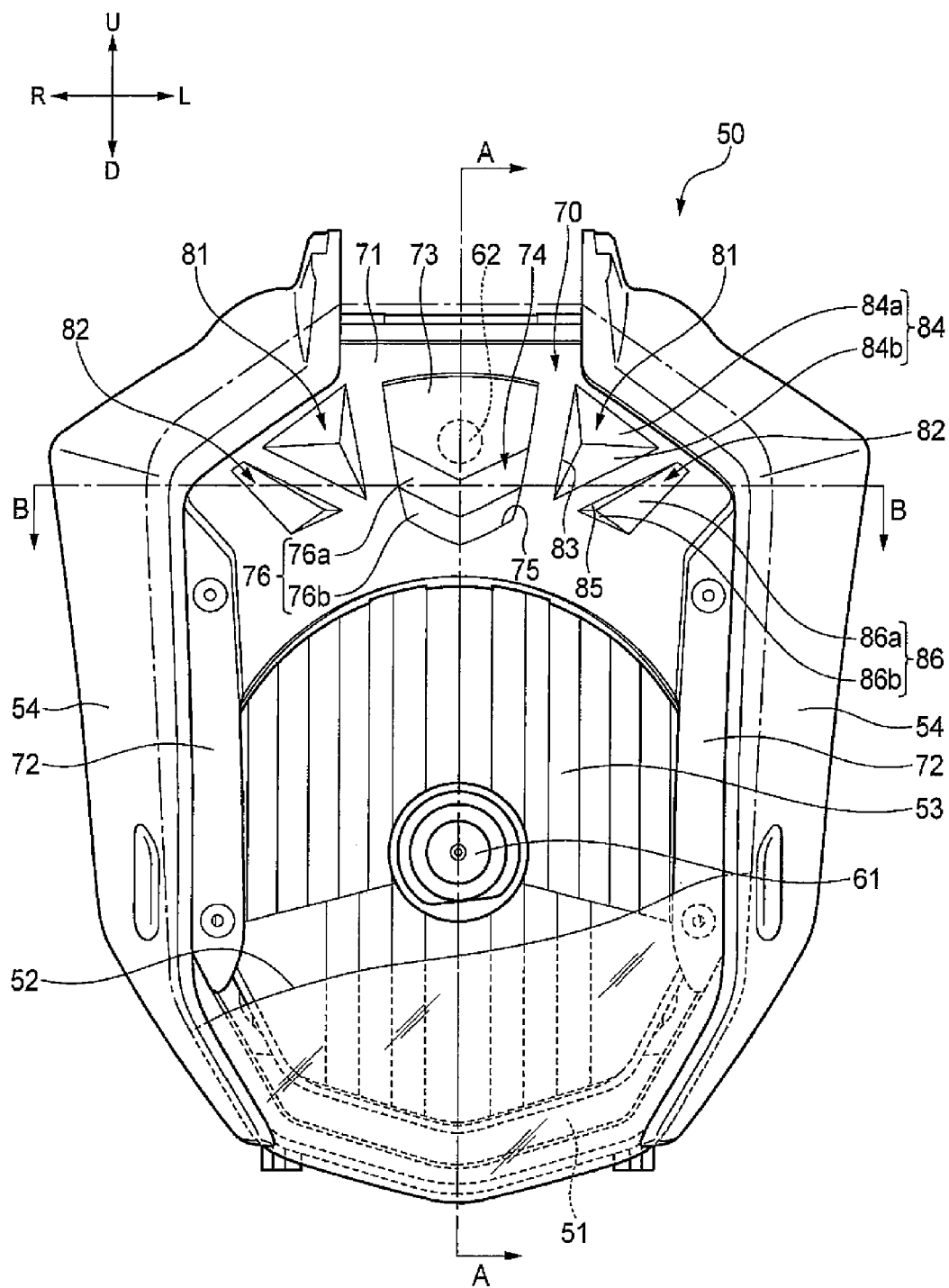
FIG. 2 is a front view of the head light device shown in FIG. 1.
Figure 3:
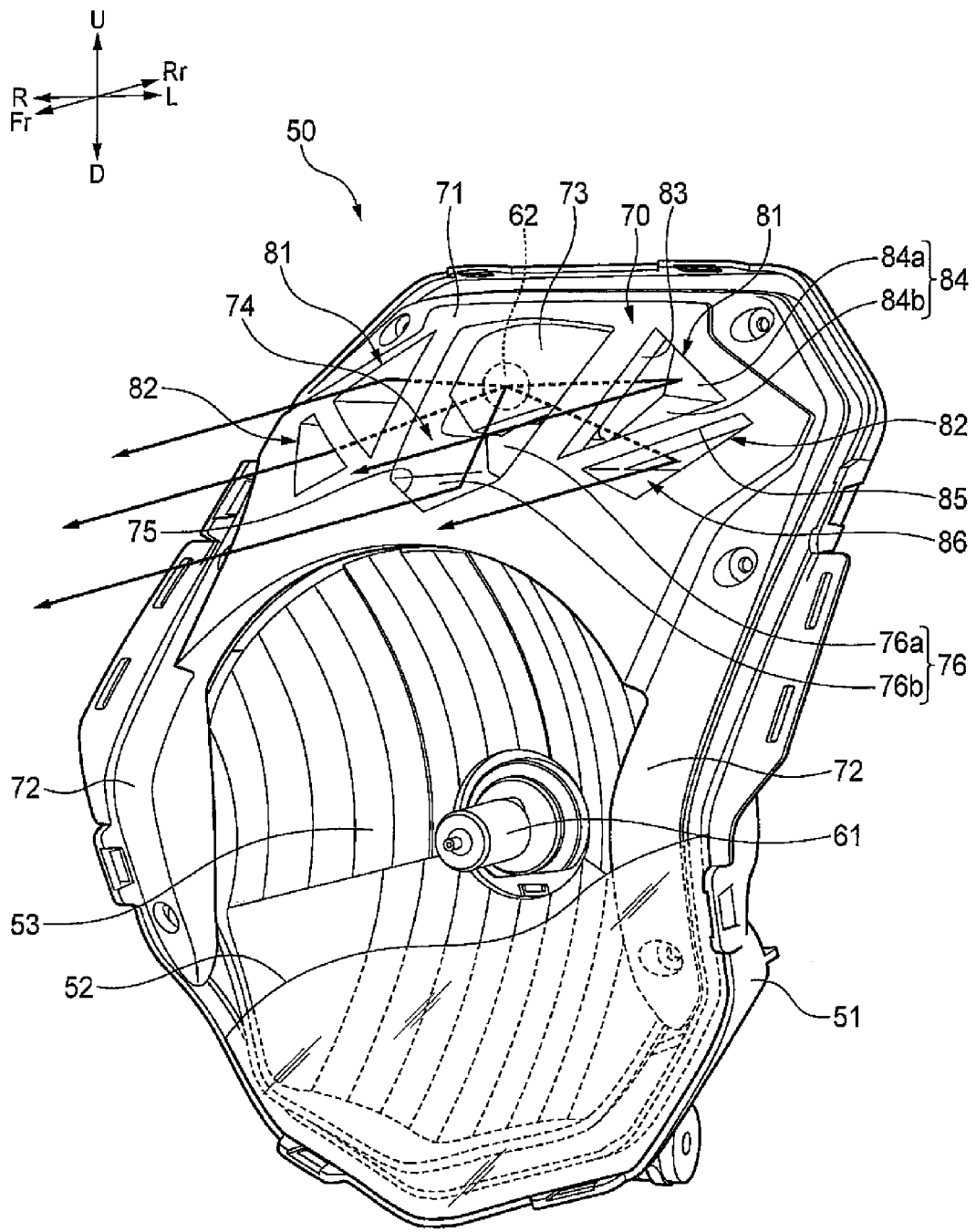
FIG. 3 is a perspective view showing the head light device shown in FIG. 2 where a side cover is removed.

As shown in FIGS. 2 and 3, according to one embodiment, the extension 70, having an upper extension covering a position above the reflector 53 and side extensions 72 extending downward from both left and right sides of the upper extension 71, covering left and right sides of the reflector 53, and extending to a position below the head light bulb 61, is attached to the head light housing 51.

As shown in FIGS. 2, 3, 5 and 6, according to one embodiment, the upper extension 71 includes a front eave 73 covering a position in front of the position light bulb 62, and an upper transparent member 74 provided below the front eave 73, to guide bulb light of the position light bulb 62 to the outside. A first side transparent member 81 and a second side transparent member 82 arrayed on the both left and right sides of the front eave 73 and in a circumferential direction with the head light bulb 61 as a center, to guide the bulb light of the position light bulb 62 to the outside, are also included in the upper extension 71.

As shown in the exemplary embodiments of FIGS. 3 and 5, the front eave 73 can be a plate member having an approximate home-base shape in a front view formed at a one-step lower level than the surface of the upper extension 71. With this front eave 73, the position light bulb 62 may not be directly seen from the outside.

As shown in FIGS. 2, 3, 5 and 6, according to one embodiment, the upper transparent member 74 has an opening 75 having an approximate V-shape in a front view, formed adjacently to a position below the front eave 73. The upper transparent member 74 may also have a reflection member 76, formed in the rear of the opening 75, which has a back side reflecting surface 76a and a lower side reflecting surface 76b to reflect the bulb light of the position light bulb 62 and guide the bulb light to the outside.

As shown in FIGS. 2, 3, 5 and 6, in one embodiment, the first side transparent member 81 has an opening 83 having an approximate triangular shape in a front view, and a reflection member 84, formed in the rear of the opening 83. Reflection member 84 has inwardly-curved upper and lower reflecting surfaces 84a and 84b to reflect the bulb light of the position light bulb 62 and guide the bulb light to the outside.

As shown in FIGS. 2, 3, 5 and 6, according to an embodiment, the second side transparent member 82 has an opening 85 having an approximate triangular shape in a front view, and a reflection member 86, formed in the rear of the opening 83. Reflection member 86 has inwardly-curved upper and lower reflecting surfaces 86a and 86b to reflect the bulb light of the position light bulb 62 and guide the bulb light to the outside.

In the head light device 50 having the above-described structure, as shown in the examples of FIGS. 3, 5 and 6, the bulb light of the position light bulb 62 can be reflected with respective reflection members 76, and 86 of the upper transparent member 74 in the extension 70, the first side transparent members 81 and the second side transparent members 82, and guided via the respective openings 75, 83 and 85 to the outside. Then the position light bulb 62, with the front eave 73, cannot be directly seen from the outside. Note that the arrows in the figures show an example of bulb light of the position light bulb 62.

As described above, according to the head light device 50 in the present example, as the extension covers the position in front of the position light bulb 62, and the extension 70 is provided with the openings 75, 83 and 85 and the reflection members 76, 84 and 86 to guide the bulb light of the position light bulb 62 to the outside, the position light bulb 62 cannot be directly seen from the outside. As a result, the outer appearance of the position light in the motorcycle 10 upon turning-on and turning-off of the position light can be improved, and a distinction between the outer appearance upon turning-on of the head light and that upon turning-on of the position light can be easily made, and a distinction between the outer appearance upon turning-on of the head light and that upon turning-on of the position light can be easily made. Further, as the openings 75, 83 and 85 and the reflection members 76, 84 and 86 can be provided in arbitrary positions of the extension 70, the outer appearance upon turning-on of the position light can be arbitrarily set. Specifically, the outer appearance upon turning-on of the position light can be arbitrarily set, thereby the outer appearance of the position light in the motorcycle 10 can be improved.

Further, according to the head light device 50 of the present example, as the position light bulb 62 is provided above the head light bulb 61, the front eave 73 covering the position in front of the position light bulb 62 is provided in the extension 70, and the upper transparent member 74 having the opening 75 and the reflection member 76 to guide the bulb light of the position light bulb 62 to the outside is provided below the front eave 73, the position light bulb 62 cannot be directly seen from the outside. Therefore, the outer appearance of the position light in the motorcycle 10 upon turning-on and turning-off of the position light can be improved, and a distinction between the outer appearance upon turning-on of the head light and that upon turning-on of the position light can be easily made. Further, as the upper transparent member 74 can be provided in an arbitrary position of the extension 70, the outer appearance upon turning-on of the position light can be arbitrarily set, and the outer appearance of the position light in the motorcycle 10 can be improved. Especially, in a naked type motorcycle without a cowl or fairing around the head light device 50, as the space between the head light device 50 and the meter 36 is visible, the position light can be integrally provided above the head light device 50, and the space between the head light device and the meter 36 can be filled. Further, by the light-guide opening for the position light, an individual-styled light emission image which compensates for the absence of a cowl can be produced about the front part of such a naked type motorcycle.

In addition, according to the head light device 50 of the present example, as the front eave 73 is formed at a one-step lower level than the surface of the extension 70, transmission of the head of the position light bulb 62 via the front eave 73 to the lens 52 can be suppressed.

Further, according to the head light device 50 of the present example, as the first side transparent member 81 and the second side transparent member 82 having the openings 83 and 85 and the reflection members 84 and 86 to guide the bulb light of the position light bulb 62 to the outside are provided on the sides of the front eave 73, it appears as if plural position lights exist, and the outer appearance of the position light in the motorcycle 10 can be improved.

Further, according to the head light device 50 of the present example, as the first side transparent member 81 and the second side transparent member 82 are concave members having an approximate triangular shape in a front view, and their reflection members 84 and 86 have the inwardly curved upper reflecting surfaces 84a and 86a and lower reflecting surfaces 84b and 86b, the bulb light of the position light bulb 62 can be efficiently reflected, and the outer appearance of the position light in the motorcycle 10 can be improved.

Further, according to the head light device 50 of the present example, as the first side transparent members 81 and second side transparent members 82 are provided in plural positions on one side of the extension 70 in the circumferential direction with the head light bulb 61 as a center, it appears as if plural position lights exist, and the outer appearance of the position light in the motorcycle 10 can be improved.

Further, according to the head light device 50 of the present example, as the extension 70 has the upper extension 71 covering the position above the reflector 53 and the side extensions 72 extending downward from the sides of the upper extension 71, it can efficiently cover the perimeter of the reflector 53.

Further, according to the head light device 50 of the present example, as the position light bulb 62 and the extension 70 are attached to the head light housing 51, the head light bulb 61 is attached to the reflector 53, and the reflector 53 is swingably supported with the head light housing 51 via the aiming device 55, the optical axis of the head light bulb 61 can be adjusted.

Note that the present invention is not limited to the above-described examples, but can be changed in various ways without departing from the spirit and scope of the present invention.

For example, in the above-described examples, the head light device of the present invention is mounted in a motorcycle, however, the invention is not limited to this example, but the head light device of the present invention may be mounted in various saddle-ride vehicles such as an ATV.

DESCRIPTION OF REFERENCE NUMERALS

10 . . . motorcycle
50 . . . head light device
51 . . . head light housing
52 . . . lens
53 . . . reflector
54 . . . side cover
55 . . . aiming device
61 . . . head light bulb
62 . . . position light bulb
70 . . . extension
71 . . . upper extension
72 . . . side extension
73 . . . front eave
74 . . . upper transparent member
75 . . . opening
76 . . . reflection member
81 . . . first side transparent member
82 . . . second side transparent member
83, 85 . . . opening
84, 86 . . . reflection member

We claim:
1. A motorcycle head light device comprising:
a head light bulb;
a position light bulb provided around the head light bulb;
a reflector configured to reflect bulb light of the head light bulb; and
an extension configured to cover the perimeter of the reflector,
wherein the extension is configured to cover a position in front of the position light bulb,
wherein the extension is provided with openings and reflection members configured to guide the bulb light of the position light bulb to the outside,
wherein the extension is provided with a front eave configured to cover the position in front of the position light bulb,
wherein side transparent members comprising the openings and the reflection members that guide the bulb light of the position light bulb to the outside are provided on the sides of the front eave, and
wherein the reflection members of the side transparent members have inwardly curved upper and lower surfaces.
2. The motorcycle head light device according to claim 1, wherein the position light bulb is provided above the head light bulb, and
wherein an upper transparent member having the opening and the reflection member that guide the bulb light of the position light bulb to the outside is provided below the front eave.

3. The motorcycle head light device according to claim 2, wherein the front eave is formed at a one-step lower level than the surface of the extension.

4. The motorcycle head light device according to claim 1, wherein the side transparent members are concave members having an approximate triangular shape in a front view.

5. The motorcycle head light device according to claim 1, wherein the side transparent members are provided in a plurality of positions on one side of the extension in a circumferential direction with the head light bulb as a center.

6. The motorcycle head light device according to claim 1, wherein the extension has an upper extension covering a position above the reflector and a side extension extending downward from a side of the upper extension.

7. The motorcycle head light device according to claim 1, wherein the position light bulb and the extension are attached to the head light housing,
wherein the head light bulb is attached to the reflector, and
wherein the reflector is swingably supported with the head light housing.

8. A method, comprising:
providing a head light bulb;
providing a position light bulb around the head light bulb;
reflecting, by a reflector, bulb light of the head light bulb;
covering the perimeter of the reflector with an extension, wherein the extension covers a position in front of the position light bulb;
providing the extension with openings and reflection members for guiding the bulb light of the position light bulb to the outside;
providing the extension with a front eave for covering the position in front of the position light bulb;
providing side transparent members comprising the openings and the reflection members that guide the bulb light of the position light bulb to the outside on the sides of the front eave,
wherein the reflection members of the side transparent members have inwardly curved upper and lower surfaces.

9. The method according to claim 8, wherein the providing of the position light bulb comprises providing the position light bulb above the head light bulb, the method further comprising
providing an upper transparent member having the opening and the reflection member that guide the bulb light of the position light bulb to the outside below the front eave.

10. The method according to claim 9, wherein the front eave is formed at a one-step lower level than the surface of the extension.

11. The method according to claim 8, wherein the side transparent members are concave members having an approximate triangular shape in a front view.

12. The method according to claim 8, further comprising providing the side transparent members in a plurality of positions on one side of the extension in a circumferential direction with the head light bulb as a center.

13. The method according to claim 8, further comprising providing the extension with an upper extension covering a position above the reflector and a side extension extending downward from a side of the upper extension.

14. The method according to claim 8, further comprising attaching the position light bulb and the extension to the head light housing,
attaching the head light bulb to the reflector, and
swingably supporting the reflector with the head light housing.

15. A motorcycle head light device, comprising:
head light means for providing head light illumination;
position light means provided around the head light means, the position light means for providing position illumination;
reflecting means for reflecting light of the head light means; and
extension means for covering the perimeter of the reflecting means,
wherein the extension means cover a position in front of the position light means,
wherein the extension means is provided with openings and reflection members for guiding the light of the position light means to the outside,
wherein the extension means is provided with a front eave means for covering the position in front of the position light bulb,
wherein side transparent members comprising the openings and the reflection members that guide the bulb light of the position light bulb to the outside are provided on the sides of the front eave means, and
wherein the reflection members of the side transparent members have inwardly curved upper and lower surfaces.

* * * * *